United States Patent
Buckley

(10) Patent No.: US 7,760,712 B2
(45) Date of Patent: *Jul. 20, 2010

(54) SYSTEM AND METHOD FOR MANAGING CALL CONTINUITY IN IMS NETWORK ENVIRONMENT

(75) Inventor: Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 240 days.

This patent is subject to a terminal disclaimer.

(21) Appl. No.: 11/503,465

(22) Filed: Aug. 11, 2006

(65) Prior Publication Data

US 2008/0123625 A1 May 29, 2008

(51) Int. Cl.
*H04L 12/66* (2006.01)

(52) U.S. Cl. ............... 370/353; 370/354; 370/356; 379/88.17; 455/403; 455/428

(58) Field of Classification Search ............... 370/328, 370/356, 352, 401, 471, 392, 353, 354, 355; 455/445

See application file for complete search history.

(56) References Cited

U.S. PATENT DOCUMENTS

| | | | |
|---|---|---|---|
| 2005/0058125 A1* | 3/2005 | Mutikainen et al. | 370/354 |
| 2006/0209805 A1* | 9/2006 | Mahdi et al. | 370/352 |
| 2007/0002831 A1* | 1/2007 | Allen et al. | 370/352 |
| 2007/0014281 A1* | 1/2007 | Kant | 370/352 |
| 2007/0049281 A1* | 3/2007 | Chen et al. | 455/445 |
| 2007/0058788 A1* | 3/2007 | Mahdi et al. | 379/88.17 |
| 2007/0254625 A1* | 11/2007 | Edge | 455/404.1 |
| 2008/0008157 A1* | 1/2008 | Edge et al. | 370/351 |

OTHER PUBLICATIONS

U.S. Appl. No. 60/815,738, filed on Jun. 21, 2006.*
European Search Report; Jan. 23, 2007; 6 pages.
T. Alexiou et al.; "the SIP ALLOCATE Method"; SIPPING Working Group; Feb. 2002; pp. 1-9 (front and back).
"Communication Management"; XP-002103158; pp. 501-565 (front and back).
3rd Generation Partnership Project; Technical Specification Group Services and System Aspects; Voice Call Continuity between CS and IMS Study (Release 7); Global System for Mobile Communications; pp. 1-153 (front and back).
EPO Extended European Search Report in Application No. 09154845.3; European Patent Office; Apr. 22, 2009; 6 pages.
Digital cellular telecommunications system (Phase 2+); Numbering, addressing and identification (3GPP TS 03.03 version 5.5.0 Release 1996); Global System for Mobile Communications; Sep. 2003; 22 pages.
China Office Action, Application No. 200710007388.8; Republic of China; Oct. 30, 2009; 9 pages.

* cited by examiner

*Primary Examiner*—Fan Tsang
*Assistant Examiner*—Simon King
(74) *Attorney, Agent, or Firm*—The Danamraj Law Group, P.C.

(57) ABSTRACT

In one embodiment, a scheme is disclosed for managing call continuity in a network environment including a circuit-switched (CS) network and an IP multimedia subsystem (IMS) network wherein unique identity (ID) information supplied by a user equipment (UE) device is utilized. A pool of dynamically allocable IP multimedia routing numbers (IMRNs) maintained at an IMS network node are used for associating an IMRN with call information received from the UE device, which can include at least one of a GRUU, Instance ID, and the called party number relating to a call. When the dynamically allocated IMRN is returned by the UE device, the network node utilizes the IMRN mapping to effectuate call continuity with respect to the called party.

16 Claims, 9 Drawing Sheets

SYSTEM AND METHOD FOR MANAGING CALL CONTINUITY IN IMS NETWORK ENVIRONMENT

FIELD OF THE DISCLOSURE

The present patent disclosure generally relates to call processing in communications networks. More particularly, and not by way of any limitation, the present patent disclosure is directed to a system and method for managing call continuity in a network environment including a circuit-switched (CS) network and an IP multimedia subsystem (IMS) network.

BACKGROUND

Mobile voice-over-IP (VoIP) handover is the process of continuing a voice call as a user moves between IP-based networks (e.g., wireless LAN (WLAN) or Wi-MAX networks, etc.) and circuit-switched cellular networks. To effectuate such handover, current $3^{rd}$ Generation Partnership Project (3GPP) standards specify that when a dual mode wireless user equipment (UE) device originates a call requesting inter-domain continuity, the call be routed to a call continuity control function (CCCF) element that is disposed in a new, IP-based network architecture referred to as the IP multimedia subsystem (IMS). One of the proposed solutions to implement the call routing process involves providing a Public Service Identity in the form of an E.164 number (e.g., a called party number) to which a call reference identity may be appended to generate an IP multimedia routing number (IMRN). However, when call reference identity digits are appended to the E.164 number, it results in a number that is longer than the 15-digit length limitation specified under the ITU-T standards. It is therefore possible that the extra digits may be lost when such a number is routed via a network. Further, if there is a reliance on the Caller ID information being provided to the CCCF element in the IMS network, this information may be lost in the international ISDN infrastructure using the ISDN User Part (ISUP) signaling. Additionally, since IMS is designed to support multiple registrations of a common Public Identity from different UE devices, establishing correct call legs becomes paramount in effectuating call continuity.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
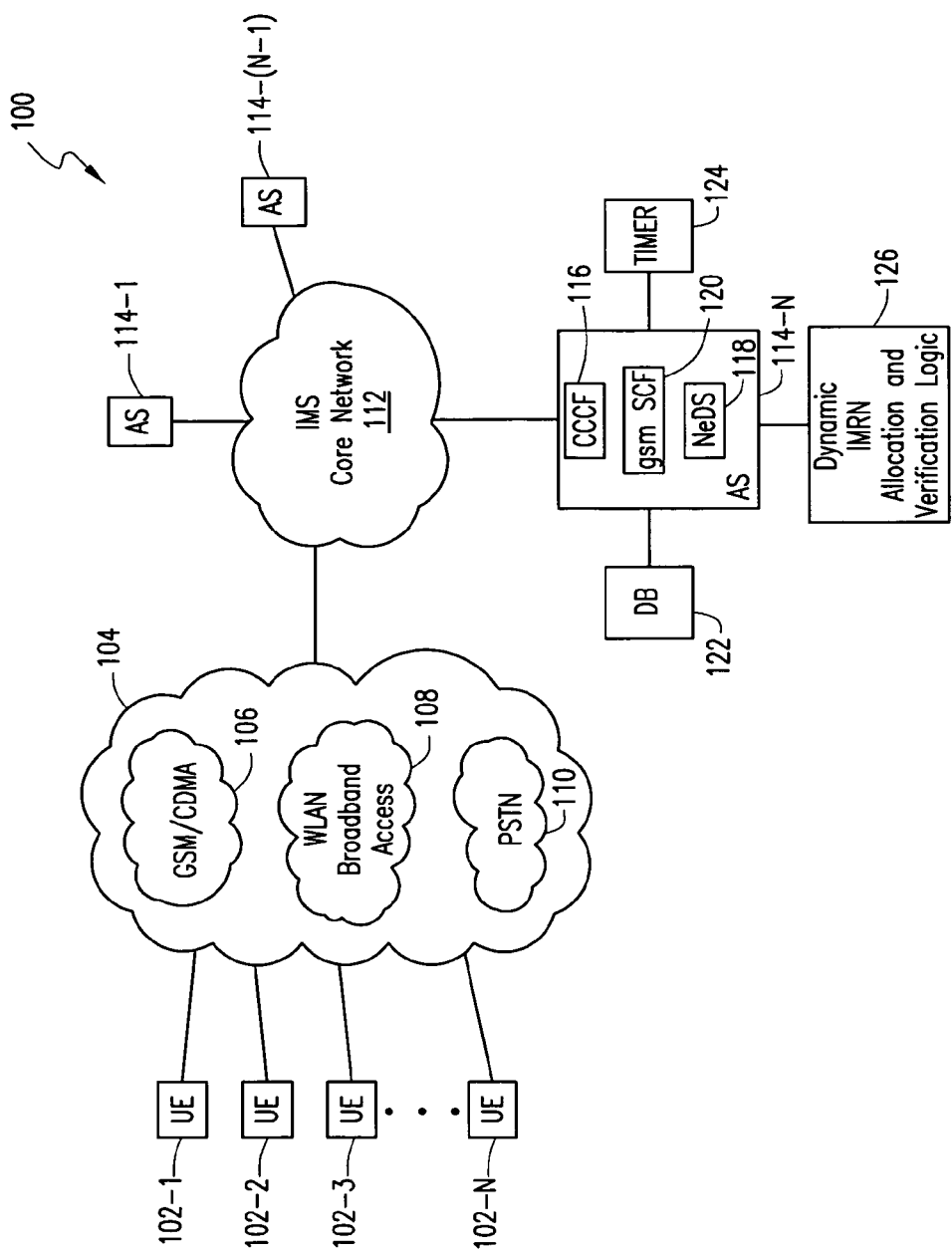
FIG. 1 depicts a network environment including circuit-switched network infrastructure and IM multimedia subsystem (IMS) infrastructure wherein an embodiment of the present patent disclosure may be practiced.

The present patent disclosure is broadly directed to a scheme for managing call continuity in a network environment including a circuit-switched (CS) network and an IP multimedia subsystem (IMS) network wherein certain unique identity (ID) information supplied by a user equipment (UE) device is utilized. The unique ID information may comprise an Instance ID and/or a Globally Routable User Agent Uniform Resource Identifier (GRUU). Further, the Instance ID could be IMEI, IMEISV, MIN, ESN, MAC address or any other unique Layer-2 address that could be used to identify the UE device. When a call is originated by the UE device, call information associated with the call, including the unique ID information, is provided to a node disposed in the IMS network. At the network node, a pool of E.164 numbers are maintained as IP multimedia routing numbers (IMRNs) that can be dynamically allocated for association with at least a portion of the call information received from the UE device. The network node associates a select IMRN with at least a portion of the call information in a mapping relationship, wherein the unique ID information corresponds to an ongoing call, and returns it to the UE device. When the dynamically allocated IMRN is transmitted by the UE device, the network node utilizes the IMRN mapping to effectuate call continuity with respect to the called party. The IMRN may then be released back to the pool of IMRNs for future use. Appropriate timers may be provided at the device and CCCF endpoints so that it can be verified whether a call reference number associated with the call remains valid (e.g., it has not timed out) or the dynamically allocated IMRN remains valid (e.g., it has not timed out). Optionally, the released IMRN may be quarantined for a period of time.

In one aspect, an embodiment of a method is disclosed that is operable with a UE device in association with a call in an IMS network. The claimed embodiment comprises: providing call information associated with the call by the UE device to a network node disposed in the IMS network; responsive to receiving a dynamically allocated IMRN from the network node, wherein the dynamically allocated IMRN is mapped to at least a portion of the call information, verifying that a call reference number associated with the call is valid; and upon verification, providing the dynamically allocated IMRN by the UE device to the network node for effectuating call continuity based on a relationship between the dynamically allocated IMRN and the call information.

In another aspect, disclosed herein is an embodiment of a UE device operable to originate a call in an IMS network. The claimed embodiment comprises: means for providing call information associated with the call to a network node disposed in the IMS network; means, responsive to receiving a dynamically allocated IMRN from the network node, wherein the dynamically allocated IMRN is mapped to at least a portion of the call information, for verifying that a call reference number associated with the call is valid; and means, responsive to the verifying, for providing the dynamically allocated IMRN to the network node for effectuating call continuity based on a relationship between the dynamically allocated IMRN and the call information.

In yet another aspect, disclosed herein is an embodiment of an IMS network node, comprising: means for maintaining a pool of IMRNs, wherein a select IMRN is dynamically allocable to at least a portion of call information received from a UE device with respect to a call originated by the UE device; means for associating the select IMRN with a unique ID parameter (i.e., GRUU, IMEI, IMEISV, MIN, ESN, MAC address or any other unique Layer-2 address, etc.) received from the UE device and for providing the select IMRN to the UE device; and means for verifying that the select IMRN remains valid when the select IMRN is returned to the network node for effectuating a call continuity process with respect to the call.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for managing call continuity with respect to a call originated by a UE device. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various services, e.g., VCC, PTT, etc., as alluded to hereinabove. Particularly, a VCC AS node 114-N is operable to effectuate call continuity and appropriate domain selection with respect to calls originated by VCC-capable devices. Typically, AS 114-N may be provided as part of the subscribers' home IMS core network which implements functionality referred to as call continuity control function (CCCF) 116 and network domain selection (NeDS) 118. In essence, the CCCF portion 116 of AS 114-N is operable as a new IMS application server element that resides in the home IMS network and tracks all call sessions and related mobile voice-over-IP (VoIP) bearer traffic, including call handover/routing between CS and IMS domains. The NeDS portion 118 of AS 114-N is responsible for performing, inter alia, registration/de-registration management between the IMS and CS networks (e.g., GSM or CDMA). Despite being potentially separate functions, it is possible to integrate both the CCCF and NeDS functionalities into a single IMS-compatible network element 114-N as illustrated in FIG. 1. Also, a suitable session control function (SCF) 120 may be provided as part of the VCC AS node 114-N with respect to applicable radio access technology, e.g., gsmSCF. Additional VCC-related functional entities may include the following: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D), which form a "VCC Application". Accordingly, for purposes of the present disclosure, the term "network node" with reference to an IMS core network (such as, e.g., AS 114-N) may comprise one or more of the following functionalities in any combination as applicable: FE-A through FE-D, gsmSCF, CCCF, and NeDS.

Furthermore, although not shown in FIG. 1, a master user database, referred to as a Home Subscriber Server or HSS, is provided as part of the home IMS network 112, for supporting the various IMS network entities that actually manage calls or sessions such as VCC node 114-N. In general, the HSS database may contain user profiles (i.e., subscription-related information), including various user and device identifies such as International Mobile Subscriber Identity (IMSI), Temporal Mobile Subscriber Identity (TMSI), International Mobile Equipment Identity (IMEI), Mobile Subscriber ISDN Number (MSISDN), as well as additional IMS-specific identities such as IM Multimedia Private Identity (IMPI) and IP Multimedia Public Identity (IMPU) that are implemented as Tel-Uniform Resource Identifiers (URIs) or SIP-URIs. Whereas the IMPI is unique to a particular UE device, it is possible to have multiple Public Identities (i.e., IMPUs) per IMPI. Further, the IMPU can also be shared with another UE device such that two or more devices can be reached with the same identity (e.g., a single phone number for an entire family).

Additionally, appropriate database structures (e.g., DB 122), timer mechanisms (e.g., timer 124) and suitable logic 126 may be provided in association with AS 114-N for purposes of configuring and managing a pool of IP multimedia routing numbers (IMRNs), also referred to as VCC Directory Numbers or VDNs, from which a select IMRN/VDN may be dynamically allocated for purposes of managing call routing and call continuity as will be described in greater detail below.

As alluded to in the Background section of the present patent application, when a UE device originates a call requiring call continuity while the call is in progress, that call is routed to the network node of the subscriber's home IMS network. However, such call routing process is known to have various deficiencies as has been pointed out earlier.

In accordance with the teachings of the present patent disclosure, the IMS network node having the CCCF capability is preferably provided with appropriate logic/structure/software/firmware module(s) for performing the following: maintaining a pool of E.164 numbers that are operable as IMRNs which terminate on the network node; dynamically allocating a select IMRN to a called party number and/or certain unique ID information received from a UE device and providing the select IMRN to the originating UE device; verifying that the select IMRN has not timed out when that select IMRN is returned to the network node for effectuating a call routing/continuity process with respect to the called party number; and optionally, quarantining the select IMRN for a period of time upon releasing it back to the IMRN pool for future use.

To manage a pool of dynamically allocable IMRNs, the network node (e.g., VCC AS 114-N) may be configured in a number of ways with respect to the E.164 numbers. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at the network node in order to ensure that the allocated IMRNs remain valid (e.g., they have not timed out, that is, they are used within appropriate time limits) or suitable quarantine times are applied. As will be described in detail below, management of timers associated with IMRNs at the network node and timers associated with call reference numbers at the originating UE device allows for dynamic provisioning of IMRNs that could be used for call routing/continuity without having to append extra digits to the E.164 number to create an IMRN.

Figure 2A:
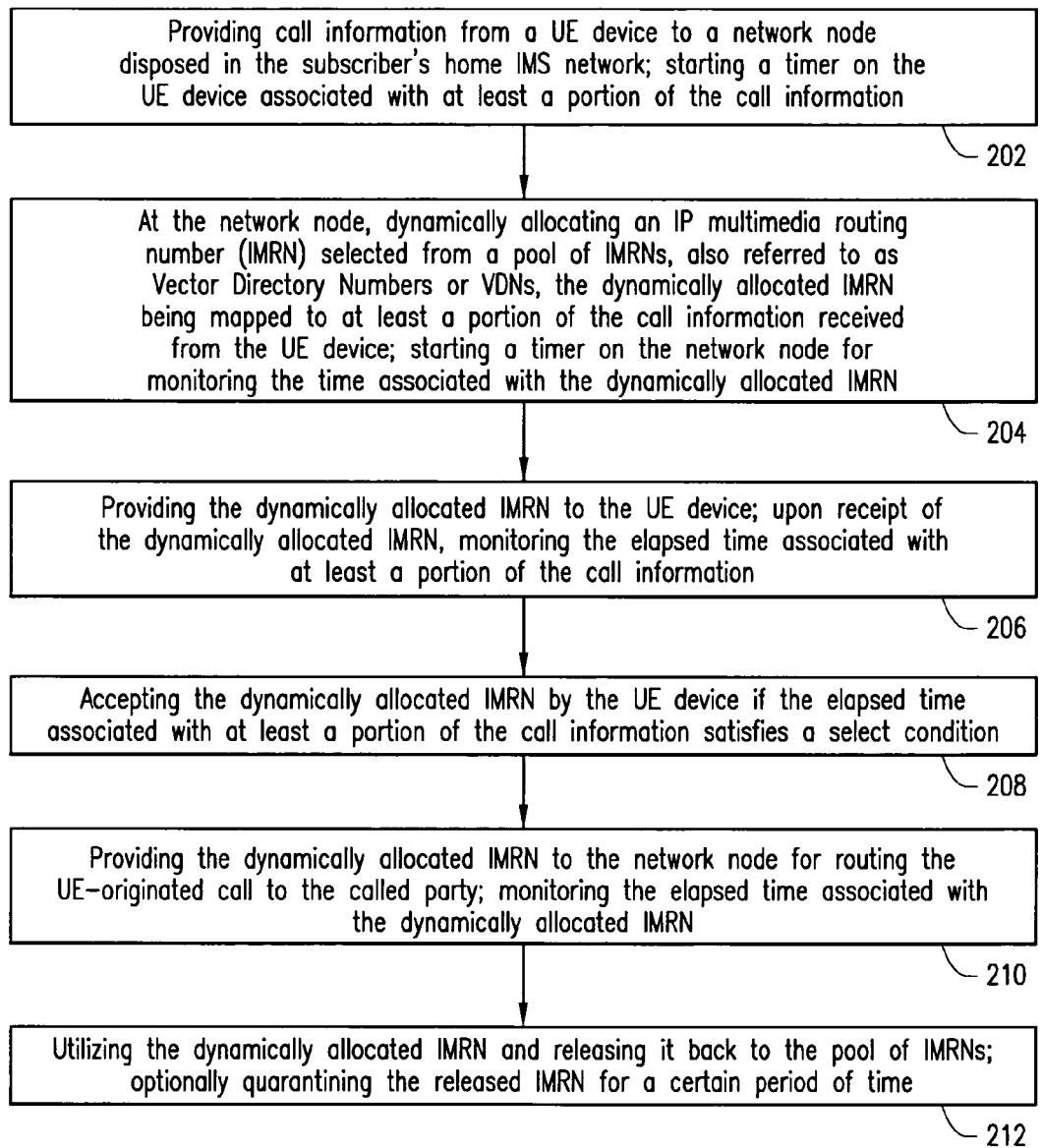
FIGS. 2A-2C depicts flowcharts associated with one or more exemplary embodiments of the present patent disclosure.

FIG. 2A depicts a flowchart of an exemplary embodiment of an overall methodology of the present patent disclosure for managing call routing/continuity with respect to a call by a UE device. At block 202, various pieces of information relating to the call (which may be collectively referred to as "call information" herein), such as a call reference number associated with the call, called party number (or, the B number), sub-address information, as well as unique ID information associated with the UE, are provided by the originating UE device to an IMS network node, e.g., AS network node 114-N. In accordance with the teachings herein, the unique ID information may comprise an Instance Identifier (ID) and/or a GRUU associated with the UE device, wherein the Instance ID may include at least one of an IMEI, an IMEI Software Version (IMEISV), a MAC address or a unique Layer-2 address, an Electronic Serial Number (ESN), and a Mobile Identification Number (MIN) provided with the device. Also, a timer may be initiated on the UE device that is used for monitoring at least a portion of the call information. In particular, the timer is implemented for monitoring the elapsed time since a particular call reference number is generated and forwarded to the network node. At the network node, an IMRN selected from the pool of IMRNs is dynamically associated with respect to the call reference number, wherein the IMRN is mapped to the at least a portion of the call information, e.g., the received called party number, or Instance ID and/or GRUU (block 204). Also, a timer may be started at the network node for monitoring a time-to-live variable associated with the dynamically allocated IMRN. Thereafter, the dynamically allocated IMRN is provided to the UE device using appropriate messaging as will be described below. Upon receipt of the dynamically allocated IMRN at the UE device, the elapsed time associated with the call reference number is monitored to ensure that it is not stale (block 206). The dynamically allocated IMRN is accepted by the UE device if the time elapsed satisfies a select condition, e.g., within a time-to-live value (block 208). Appropriate setup is then initiated by the UE device using the dynamic IMRN, whereby the accepted IMRN is returned to the network node since it terminates on the network node. Upon receipt of the IMRN at the network node, its time-to-live variable is monitored to ensure that it has not timed out. Thereafter, the called party number, GRUU and/or Instance ID (i.e., unique ID data) associated with the dynamically allocated IMRN is utilized for routing the call by making the appropriate connection between the call legs (block 210). In one implementation, the dynamic IMRN may optionally be returned back to the pool of IMRNs wherein it may be quarantined for a certain period of time before it is reused or becomes available for future use (block 212).

Figure 2B:
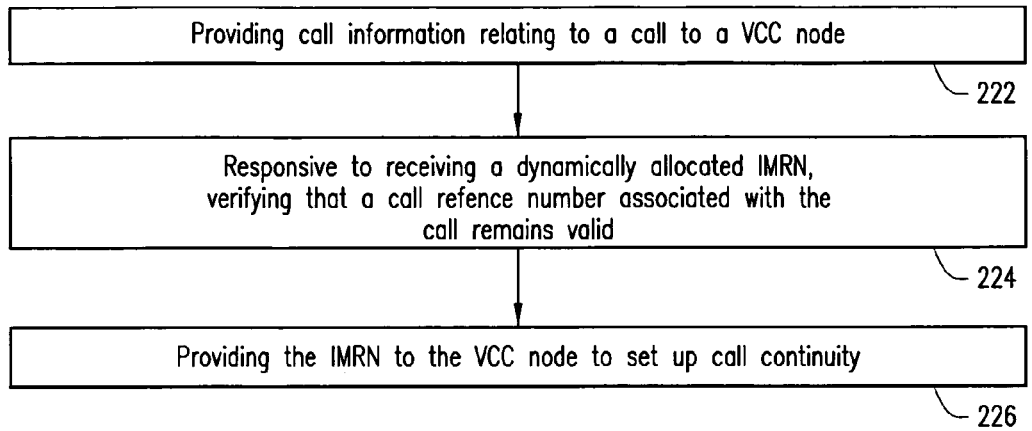
Figure 2C:
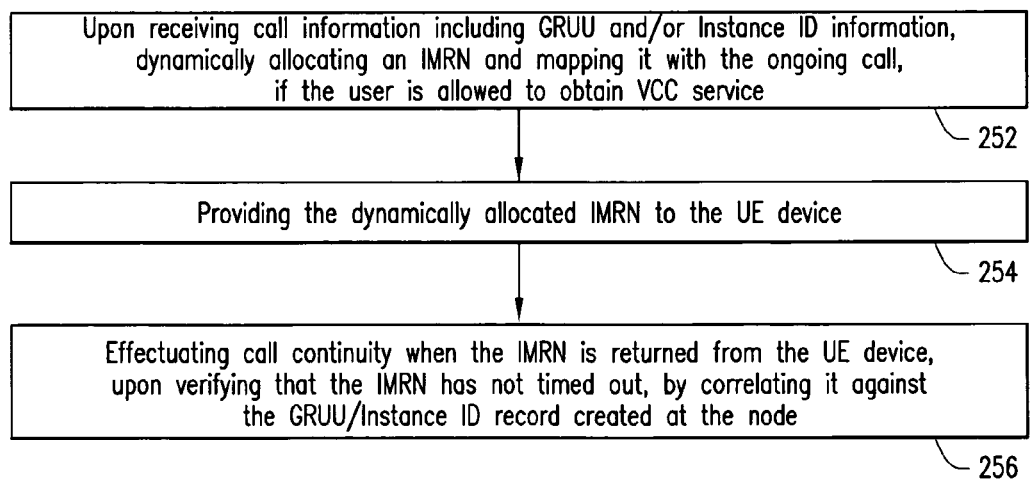

Referring now to FIGS. 2B and 2C, device-centric and network-centric portions of the above methodology are set forth in additional detail in an exemplary application. At block 222, appropriate logic of the UE device is operable to provide the call information relating to a call to a VCC node such as AS 114-N in FIG. 1. Responsive to receiving a dynamically allocated IMRN, the UE device is operable to verify that a call reference number associated with the call remains valid (block 224). Upon verification, the UE device thereafter provides the IMRN to the VCC node to set up an outgoing call leg to maintain continuity with an existing call in a different domain (block 226). With respect to the operations at the network node, e.g., AS 114-1, upon receiving the call information including the GRUU and/or Instance ID information, appropriate logic at the node interrogates its databases to perform a number of verifications. A verification may be made to determine whether the user is allowed to obtain VCC service. Another verification relates to whether the unique ID information received from the UE device exists in the network node's databases, and if so, a dynamic IMRN is allocated and associated with an ongoing call corresponding to the received unique ID information (block 252). Thereafter, the dynamic IMRN is provided to the UE device via suitable messaging (block 254). When the dynamic IMRN is returned to the network node as part of the UE's VCC call leg setup, the network node correlates the returned IMRN against the GRUU/Instance ID record created previously in order to link the VCC call leg with respect to the ongoing call (block 256). Also, the network node may include appropriate logic to verify that the received IMRN has not timed out, as set forth hereinabove.

Based on the foregoing, those skilled in the art will appreciate that when the call information, i.e., called party number, call reference number, unique ID information, etc., is sent by the UE device to the serving network node, appropriate logic at the network node may create a record that maps the received call information to an E.164-based IMRN, which is transmitted back to the UE device. Relatedly, in an exemplary application, if there is an ongoing SIP dialogue and the UE device provided its unique ID information in the SIP Invite message for that dialogue, then when the UE device transmits the GRUU and/or Instance ID in its VCC request messaging (e.g., as provided at block 202) to the VCC node to effectuate inter-domain transfer, the VCC node can correlate the request to the ongoing dialogue whereupon the dynamic IMRN may be linked to the ongoing call session. At the device side, upon correlating the received IMRN with the call reference number, the UE sets up a call using the IMRN that terminates on the network node. The IMRN is then interrogated against the IMRN/call information mapping for continuing the ongoing call to the called party.

It should be recognized by those skilled in the art that the message flow between the UE device and the home IMS network's VCC/network node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS VCC/network node. Also, there may be additional IMS control plane nodes such as Interrogating Call Session Control Function (I-CSCF) nodes and Serving CSCF (S-CSCF) nodes disposed between the MGCF node and the VCC node. Set forth below are a number of exemplary implementations of the message flow where a dynamically allocated IMRN is utilized for effectuating call routing/continuity with respect to a call originated in the CS domain.

Figure 3A:
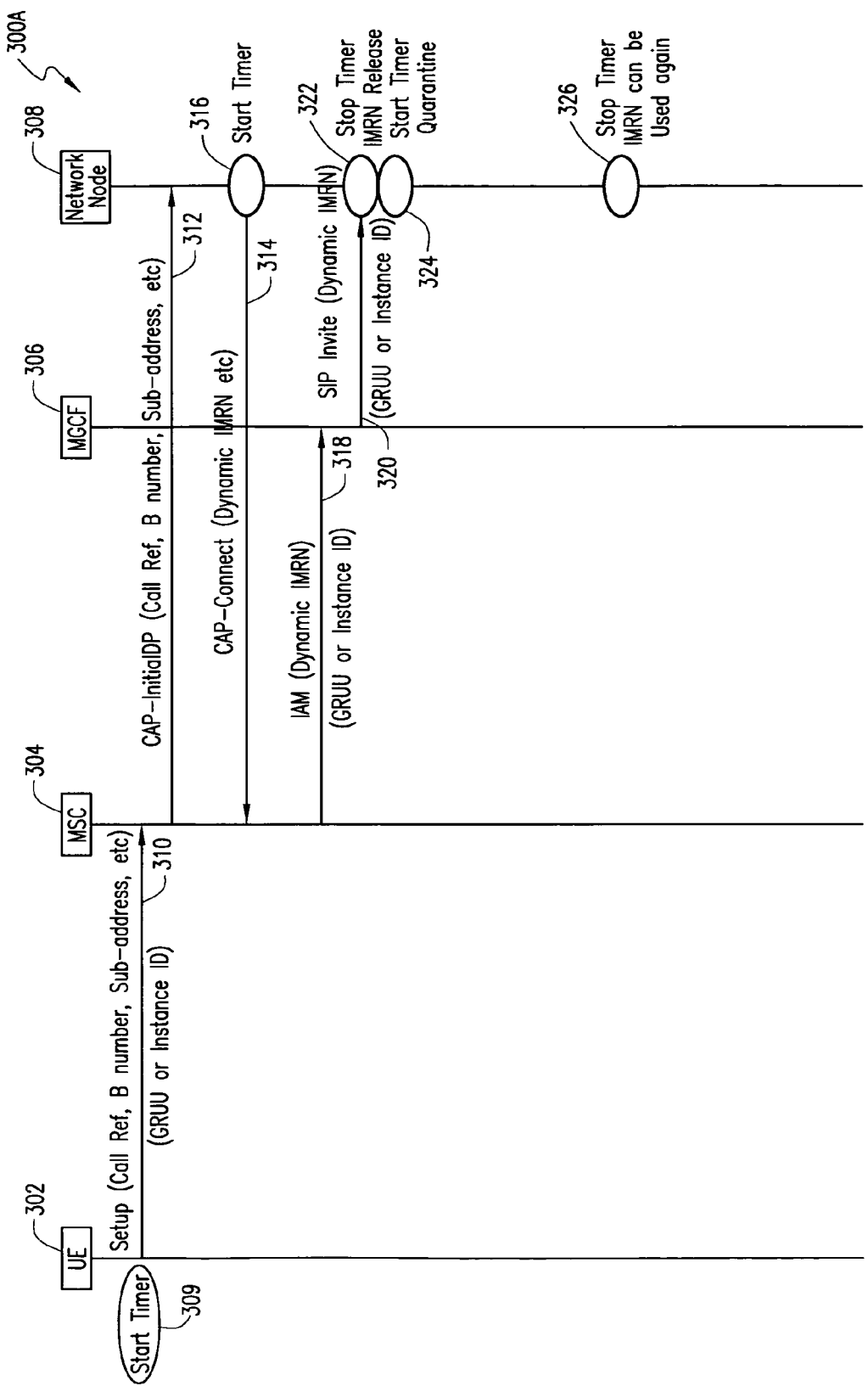
FIGS. 3A and 3B depict message flow diagrams for effectuating call continuity by employing dynamically allocated IP multimedia routing numbers (IMRNs) in accordance with an embodiment.

FIG. 3A depicts a message flow embodiment 300A wherein User-to-User signaling involving Customized Applications for Mobile Enhanced Logic (CAMEL) is implemented. Exemplary UE device 302 having the CS domain and IMS domain modes of functionality is operable to generate a setup message 310 to a visited MSC 304, wherein the setup message includes applicable call information such as call reference identity or number, called party number, sub-address information, etc. as well as the GRUU and/or Instance ID information. A suitable timer mechanism 309 may be initiated at the UE device in order to monitor a time-to-live variable associated with the call reference number. Responsive to the setup message 310, MSC 304 generates a CAMEL Application Part (CAP)-compatible message 312, Initial Detection Point (DP) message, which carries at least a portion of the call information to a network node 308 disposed in the user's home IMS network. Upon verifying that the user is allowed to do a VCC call, the gsmSCF function of the network node dynamically allocates a select IMRN based on the received called party number and returns it back to MSC 304 via a CAP Connect message 314. A suitable timer mechanism may be started (block 316) at the network node 308 in order to monitor a time-to-live variable associated with the dynamically allocated IMRN. After verifying that the call reference has not timed out based on the UE device's timer mechanism, responsive to receipt of the CAP Connect message 314, MSC 304 initiates an Initial Address Message (IAM) 318 that includes dynamic IMRN as well as GRUU and/or Instance ID in the User-to-User signaling towards MGCF 306 for call routing. A SIP Invite message 320 is generated by MGCF 306 that contains the User-to-User signaling per RFC 3033 towards the network node 308 which then uses the GRUU and/or Instance ID and optionally utilizes the dynamic for continuing the call to the called party (not shown). The network node 308 is operable to look up its ongoing calls to see if the GRUU and/or Instance ID can be found. It should be recognized that various intermediate SIP messages and resource allocation/reservation negotiations may take place between MGCF 306 and the called party subsequent to SIP Invite 320, which are not described in particular detail herein. Also, additional ISUP messaging that takes place before a bearer path is established between the UE device 302 and the called party is not shown herein.

Upon receipt of the dynamically allocated IMRN via SIP Invite 320 at the network node 308, the timer mechanism may be stopped (block 322) to verify if the IMRN has timed out. If so, the SIP Invite message may be discarded and the call routing process may be terminated. If the IMRN has not timed out, the CCCF may set up the call leg using the original called number and link it with the ongoing session based on the unique ID-IMRN correlation. Additionally, if no CallerID (CID) was received in the SIP invite message 320, the network node 308 may insert the CID with appropriate privacy options. After using the IMRN for call routing by CCCF, it may be returned to the IMRN pool, wherein a quarantine timer may be started (block 324) such that the IMRN is prohibited from further use until the quarantine timer is stopped after a period of time (block 326).

As pointed out previously, the timer mechanism at the device side may also be used to ensure that the call reference number has not timed out, which reference number is used by the UE device to correlate the information received from the network node (e.g., dynamic IMRN). If the timer expires before the same reference number is received back from the network node, the UE device may reattempt the call process a predetermined number of times (e.g., five attempts), after which if no response has been received, the call procedure may be deemed to have failed. In other words, if the UE device receives a reference number that is no longer valid, it may be discarded and the call procedure may be terminated.

Figure 3B:
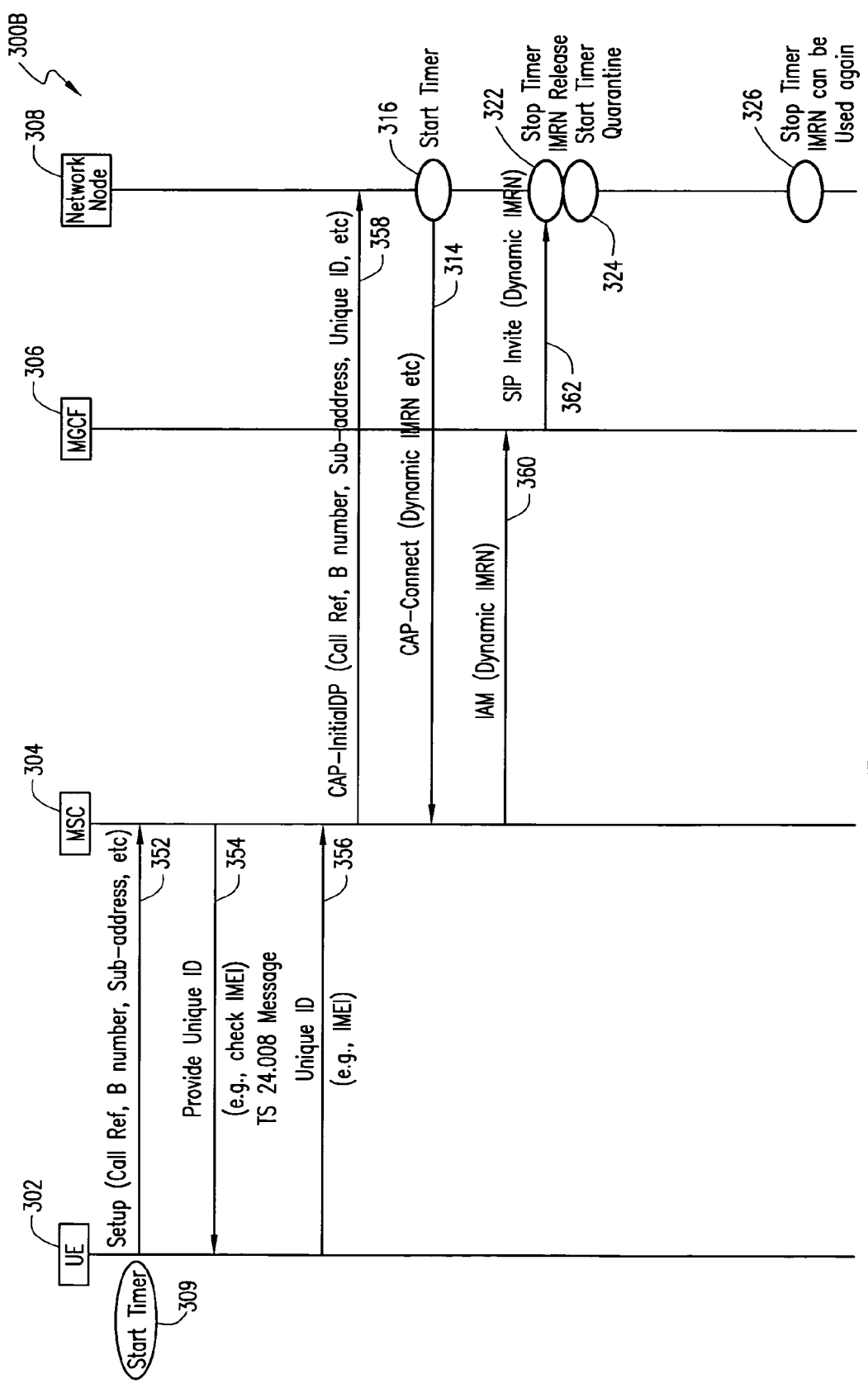

Another variation of message flow embodiment 300B is shown in FIG. 3B. The message flow embodiment 300B is similar to the embodiment 300A described above, except that additional messaging is provided between UE device 302 and MSC 304 for obtaining the unique ID data. A setup message 352 from UE 302 includes various pieces of call information but without the GRUU/Instance ID information. Responsive to the setup message 352, a request 354 is generated by MSC 304 towards UE 302 for its unique ID (e.g., Provide IMEI in 3GPP). In reply, UE 302 provides its unique ID via message 356 to MSC 304, which then generates a CAP-Initial DP message 358 that includes the UE device's unique ID data towards the network node 308. Upon verifying that the user is allowed to do a VCC call, the gsmSCF function of the network node 308 uses the unique ID data to determine if there is an ongoing call for the received unique ID. If so, a CAP-Connect message 314 containing a dynamic IMRN is provided by the network node 308 as before. After verifying that the call reference has not timed out based on the UE device's timer mechanism, responsive to receipt of the CAP Connect message 314, MSC 304 initiates an IAM 318 towards MGCF 306 for call routing. A SIP Invite message 362 is generated by MGCF 306 towards the network node 308 which then uses the dynamic IMRN for continuing the call to the called party (not shown). Also, various additional intermediate SIM messages and timer mechanisms may take place similar to the embodiment 300A described above.

Figure 4:
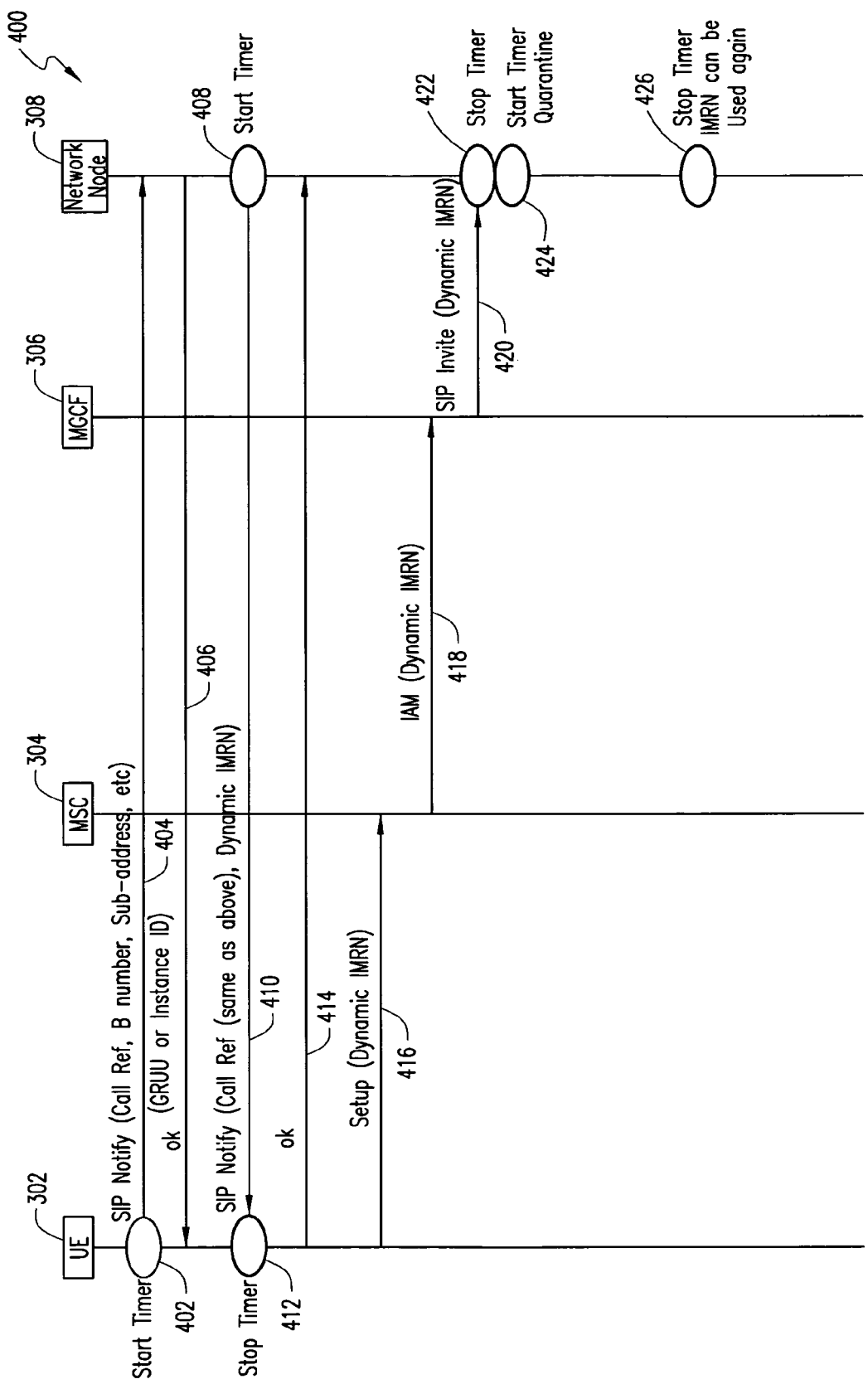
FIG. 4 depicts a message flow diagram for effectuating call continuity by employing dynamically allocated IMRNs in accordance with another embodiment.

FIG. 4 depicts a message flow embodiment 400 where a SIP Notify procedure is implemented for messaging. Similar to the CAMEL-based messaging procedure set forth above, UE device 302 having the CS domain and IMS domain modes of functionality is operable to generate a setup message to MSC 304, responsive to which a SIP Notify message 404 may be forwarded directly to the network node 308. As before, the SIP Notify message 404 includes applicable call information such as call reference number, called party number, sub-address information, and the unique ID information. A suitable timer mechanism 402 may be initiated at the UE device in order to monitor a time-to-live variable associated with the call reference number. Responsive to the SIP Notify message 404, the network node 308 generates an OK message 406 towards the UE device 302. Thereafter, upon verifying that the user is allowed to do a VCC call, the network node dynamically allocates a select IMRN based on the received call information and returns it back to UE 302 via a SIP Notify message 410. Again, a suitable timer mechanism may be started (block 408) at the network node 308 in order to monitor a time-to-live variable associated with the dynamically allocated IMRN. An OK message 414 is generated by the UE device towards the network node 308 to acknowledge receipt of the SIP Notify message 410. After verifying that the call reference has not timed out based on the UE device's timer mechanism (block 412), a setup message 416 that includes dynamic IMRN is provided by the UE device 302 to MSC 304. In response, an IAM message 418 with dynamic IMRN is generated by MSC 304 towards MGCF 306 for effectuating call routing/continuity. Similar to the messaging in CAMEL-based implementation, a SIP Invite message 420 is generated by MGCF 306 towards the network node 308 which utilizes the dynamic IMRN—unique ID mapping for continuing the call to the called party (not shown). Also, various intermediate SIP messages and resource allocation/reservation negotiations may take place between MGCF 306 and the called party subsequent to SIP Invite 420, as before. Additional ISUP messaging may also take place before a bearer path is established between the UE device 302 and the called party.

Upon receipt of the dynamically allocated IMRN via SIP Invite 420 at the network node 308, the timer mechanism may be stopped (block 422) to monitor if the IMRN is still valid. Thereafter, if the IMRN has not timed out, the CCCF may set up the call leg for effectuating call continuity as explained hereinabove. Additional processes such as IMRN release and quarantining, etc. may be effectuated by the network node 308 similar to the processes described above. Appropriate timer mechanisms (blocks 424, 426) may accordingly be implemented at the network node 308. Furthermore, the timer mechanism at the device side may also be used similarly with respect to the call reference number associated with the call.

Figure 5A:
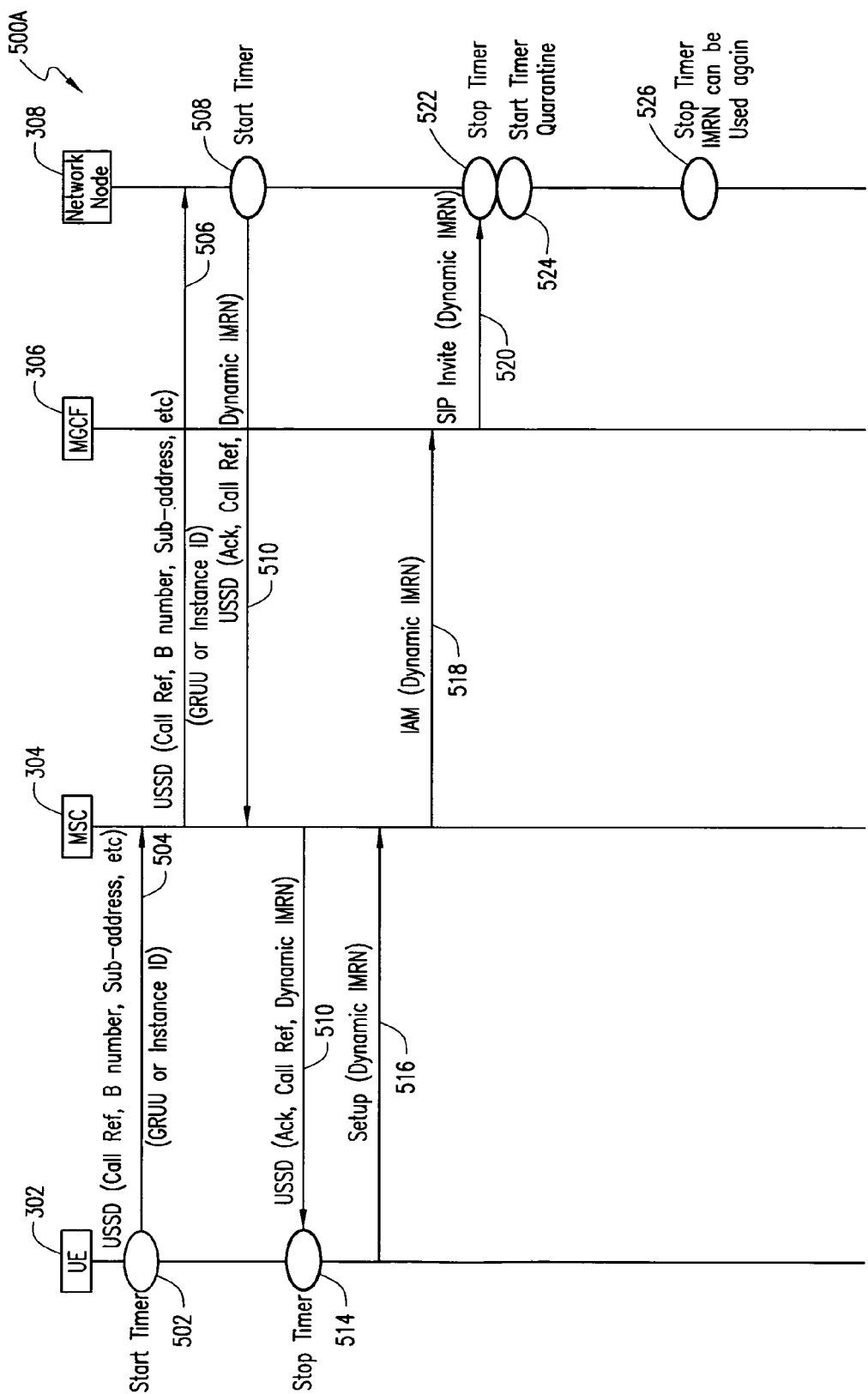
FIGS. 5A and 5B depict message flow diagrams for effectuating call continuity by employing dynamically allocated IMRNs in accordance with a still further embodiment.

FIG. 5A depicts a message flow embodiment 500A where Unstructured Supplementary Service Data (USSD) messaging is implemented. Similar to the messaging procedures set forth above, UE device 302 is operable to generate a USSD message 504 to MSC 404, responsive to which another USSD message 506 may be forwarded to the network node 308. As before, the USSD messages 504, 506 include applicable call information such as call reference number, called party number, sub-address information, unique ID information, and the like. A suitable timer mechanism 502 may be initiated at the UE device in order to monitor a time-to-live variable associated with the call reference number. Responsive to the USSD message 506, the network node 308 generates a USSD message 510 that includes both acknowledgement as well as dynamic IMRN and call reference number information towards MSC 304. This USSD message 510 is forwarded to UE 302. Again, a suitable timer mechanism may be started (block 508) at the network node 308 in order to monitor a time-to-live variable associated with the dynamically allocated IMRN. After verifying that the call reference has not timed out based on the UE device's timer mechanism (block 514), a setup message 516 that includes dynamic IMRN is provided by the UE device 302 to MSC 304. In response, an IAM message 518 with dynamic IMRN is generated by MSC 304 towards MGCF 306 for effectuating call routing/continuity. Similar to the messaging flows described previously, a SIP Invite message 520 is generated by MGCF 306 towards the network node 308 for routing the call to the called party (not shown). Upon receipt of the dynamically allocated IMRN via SIP Invite 520 at the network node 308, the timer mechanism may be stopped (block 522) to monitor if the IMRN has timed out. Thereafter, if the IMRN has not timed out, the CCCF may set up the call leg for effectuating call continuity as explained hereinabove. Additionally, processes such as IMRN release and quarantining, etc. may be effectuated by the network node 308 similar to the processes described above. Appropriate timer mechanisms (blocks 524, 526) may accordingly be implemented at the network node 308. Furthermore, the timer mechanism at the device side may also be used similarly with respect to the call reference number associated with the call.

Figure 5B:
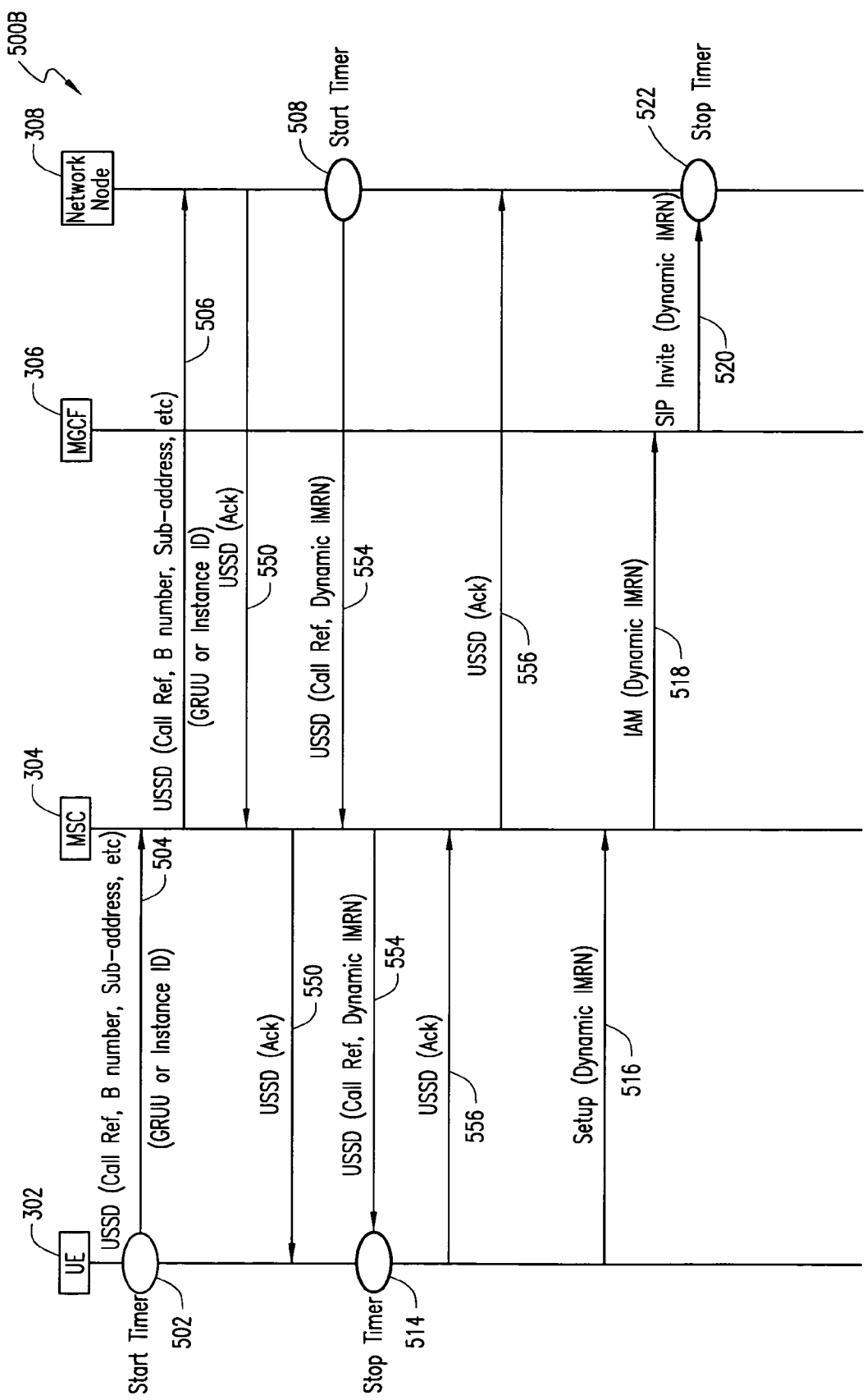

Another variation of USSD message flow embodiment 500B is shown in FIG. 5B. The message flow embodiment 500B is essentially identical to the embodiment 500A described above, except that separate USSD acknowledgement messages 550 and 556 are propagated between UE 302 and CCCF 308. Accordingly, additional USSD messaging 554 is provided for carrying the IMRN information from CCCF 308 to UE 302.

An exemplary use scenario is set forth below wherein one or more of the embodiments described above may be advantageously applied. Consider a family that has been offered VCC service, with user A (father) having UE A and user B (mother) having UE B. The service has been configured such that each UE has two IMPUs: a business number and a common house number. The following table sets forth the profiles:

TABLE I

| Device | IMPI | IMPU-1 | IMPU-2 | User |
| --- | --- | --- | --- | --- |
| UE A | Unique | X | Z | Father |
| UE B | Unique | Y | Z | Mother |

Both UE devices are operable to register from the same Access Point (AP), and further they both use the same CSCF infrastructure of the home IMS network where the S-CSCF has registered them in the same VCC application. Now, consider that UE B is using the WLAN in the house to make a phone call to her friend using IMPU Z. The call has been anchored in the VCC application so that Mother can "VCC out" if needed. Father now needs to call the plumber on the way to work so he makes a call from UE A using the same common Public Identity, i.e., IMPU Z, also. Accordingly, the network has the following information:

TABLE II

| VCC Application | UE A | UE B |
| --- | --- | --- |
| IMPI | Father | Mother |
| Requested-URI | Tel URI - Plumber | Tel URI - Friend |
| Asserted ID or CLI | IMPU Z | IMPU Z |
| From | IMPU Z | IMPU Z |
| To | E.164 Number (Plumber) | E.164 Number (Friend) |

TABLE II-continued

| VCC Application | UE A | UE B |
| --- | --- | --- |
| Contact Header | IP address K, Port Y - Behind Home NAT | IP address K, Port Z - Behind Home NAT |

Now consider that Father moves out the house and needs to continue the call using VCC into the cellular network to which he subscribes. This VCC request needs to be correlated to the correct ongoing call session, i.e., UE A's ongoing call rather than UE B's. It will be appreciated that an embodiment of the present disclosure provides the mechanism to advantageously accomplish this process whereby correct call legs are continued as the user maintains the inter-domain call session.

Figure 6:
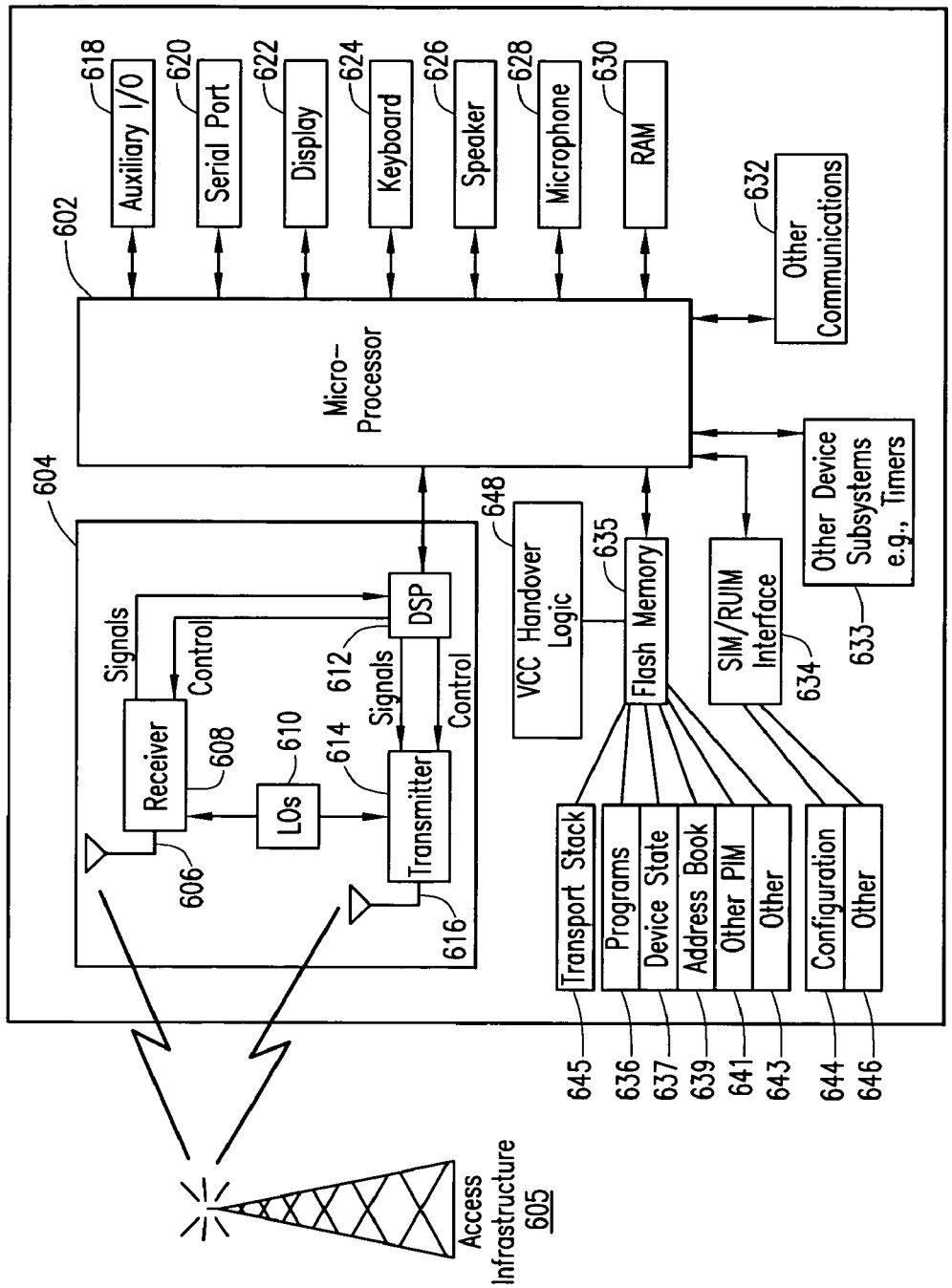
FIG. 6 depicts a block diagram of an embodiment of a communications device operable for purposes of the present patent disclosure.

FIG. 6 depicts a block diagram of an embodiment of a communications device operable as a wireless UE device, e.g., UE 302, for purposes of the present patent disclosure. It will be recognized by those skilled in the art upon reference hereto that although an embodiment of UE 302 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of an embodiment of UE 302 is operably coupled to a communication subsystem 604 that is capable of multi-mode communications (e.g., CS domain, IP domain such as IMS, et cetera). The communication subsystem 604 generally includes one or more receivers 608 and one or more transmitters 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications networks with which the mobile device is intended to operate (e.g., a CDMA network, a GSM network, WLAN, et cetera). Regardless of the particular design, however, signals received by antenna 606 through appropriate access infrastructure 605 (e.g., cellular base station towers, WLAN hot spots, etc.) are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

Microprocessor 602 may also interface with further device subsystems such as auxiliary input/output (I/O) 618, serial port 620, display 622, keyboard/keypad 624, speaker 626, microphone 628, random access memory (RAM) 630, a short-range communications subsystem 632, and any other device subsystems, e.g., timer mechanisms, generally labeled as reference numeral 633. To control access, a Subscriber Identity Module (SIM) or Removable User Identity Module (RUIM) interface 634 may also be provided in communication with the microprocessor 602. In one implementation, SIM/RUIM interface 634 is operable with a SIM/RUIM card having a number of key configurations 644 and other information 646 such as identification and subscriber-related data.

Operating system software and applicable service logic software may be embodied in a persistent storage module (i.e., non-volatile storage) such as Flash memory 635. In one implementation, Flash memory 635 may be segregated into different areas, e.g., storage area for computer programs 636 (e.g., service processing logic), as well as data storage regions such as device state 637, address book 639, other personal information manager (PIM) data 641, and other data storage areas generally labeled as reference numeral 643. A transport stack 645 may be provided to effectuate one or more appropriate radio-packet transport protocols. In addition, a call handover/continuity logic module 408 is provided for effectuating call reference ID generation, validation, verification, and correlation with IMRNs, etc. as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method operable with a user equipment (UE) device in association with an ongoing call in an Internet Protocol (IP) multimedia subsystem (IMS) network, said method comprising:

providing call information associated with said ongoing call in one domain to a network node disposed in said IMS network, said call information including a call reference number associated with said ongoing call with a called party;

receiving an IP multimedia routing number (IMRN) and said call reference number from said network node;

verifying that said call reference number received back from said network node remains valid; and sending a message containing said IMRN to said network node for effectuating call continuity with respect to said ongoing call in another domain.

2. The method as recited in claim 1, wherein said call information further includes an Instance identifier comprising a unique ID parameter.

3. The method as recited in claim 2, wherein said unique ID parameter comprises at least one of a Globally Routable User Agent (UA) Uniform Resource Identifier (URI) (GRUU), International Mobile station Equipment Identity (IMEI), an IMEI Software Version (IMEISV), an Electronic Serial Number (ESN), a Mobile Identification Number (MIN), and a unique Layer-2 address associated with said UE device.

4. The method as recited in claim 1, wherein said call information is provided to said network node via User-to-User signaling.

5. The method as recited in claim 1, wherein said call information is provided to said network node using a Session Initiation Protocol (SIP) message.

6. The method as recited in claim 1, wherein said call information is provided to said network node using an Unstructured Supplementary Service Data (USSD) message.

7. The method as recited in claim 1, wherein said IMRN is received via one of a SIP message and a USSD message.

8. The method as recited in claim 1, wherein said network node comprises one of a CCCF node and a VCC application.

9. A user equipment (UE) device operable in an Internet Protocol (IP) multimedia subsystem (IMS) network, said UE device comprising:

a processor configured to control at least one of a plurality of sub-systems to provide call information associated with an ongoing call in one domain to a network node disposed in said IMS network, said call information including a call reference number associated with said ongoing call with a called party;

the processor further configured to control at least one of the plurality of sub-systems to process an IP multimedia routing number (IMRN) received from said network node;

the processor further configured to control at least one of the plurality of sub-systems to verify that said call reference number received from said network node is valid; and the processor further configured to control at least one of the plurality of sub-systems to send a message containing IMRN to said network node for effectuating call continuity with respect to said ongoing call in another domain.

10. The UE device as recited in claim 9, wherein said call information includes an Instance identifier comprising a unique ID parameter.

11. The UE device as recited in claim 10, wherein said unique ID parameter comprises at least one of a Globally Routable User Agent (UA) Uniform Resource Identifier (URI) (GRUU), International Mobile station Equipment Identity (IMEI), an IMEI Software Version (IMEISV), an Electronic Serial Number (ESN), a Mobile Identification Number (MIN), and a unique Layer-2 address associated with said UE device.

12. The UE device as recited in claim 9, wherein said call information is provided to said network node via User-to-User signaling.

13. The UE device as recited in claim 9, wherein said call information is provided to said network node using a Session Initiation Protocol (SIP) message.

14. The UE device as recited in claim 9, wherein said call information is provided to said network node using an Unstructured Supplementary Service Data (USSD) message.

15. The UE device as recited in claim 9, wherein said IMRN is received via one of a SIP message and a USSD message.

16. The UE device as recited in claim 9, wherein said network node comprises one of a CCCF node and a VCC application.

* * * * *